US012529876B2

(12) United States Patent
Sadeghian Marnani et al.

(10) Patent No.: US 12,529,876 B2
(45) Date of Patent: Jan. 20, 2026

(54) COMPACT OPTICAL MICROSCOPE, METROLOGY DEVICE COMPRISING THE OPTICAL MICROSCOPE AND A WAFER POSITIONING METROLOGY APPARATUS COMPRISING THE METROLOGY DEVICE

(71) Applicant: Nearfield Instruments B.V., Rotterdam (NL)

(72) Inventors: Hamed Sadeghian Marnani, Rotterdam (NL); Taras Piskunov, Schiedam (RU)

(73) Assignee: Nearfield Instruments B.V., Rotterdam (NL)

( * ) Notice: Subject to any disclaimer, the term of this patent is extended or adjusted under 35 U.S.C. 154(b) by 300 days.

(21) Appl. No.: 18/286,387

(22) PCT Filed: Apr. 12, 2022

(86) PCT No.: PCT/NL2022/050200
§ 371 (c)(1),
(2) Date: Oct. 11, 2023

(87) PCT Pub. No.: WO2022/220678
PCT Pub. Date: Oct. 20, 2022

(65) Prior Publication Data
US 2024/0184089 A1  Jun. 6, 2024

(30) Foreign Application Priority Data
Apr. 12, 2021  (NL) ..................... 2027950

(51) Int. Cl.
*G02B 21/00* (2006.01)
*G02B 1/10* (2015.01)
(Continued)

(52) U.S. Cl.
CPC .......... *G02B 21/0016* (2013.01); *G02B 1/10* (2013.01); *G02B 9/14* (2013.01); *G02B 21/025* (2013.01);
(Continued)

(58) Field of Classification Search
None
See application file for complete search history.

(56) References Cited

U.S. PATENT DOCUMENTS

| | | | | |
|---|---|---|---|---|
| 7,023,622 | B2 * | 4/2006 | Liang .................... | G02B 21/02 359/660 |
| 2014/0226203 | A1 * | 8/2014 | Nakano .............. | G02B 17/0856 359/728 |

(Continued)

FOREIGN PATENT DOCUMENTS

CN        210005782 U      1/2020

OTHER PUBLICATIONS

Nternational Search Report and Written Opinion—PCT/NL2022/050200—mailing date Jul. 11, 2022.

*Primary Examiner* — Ryan Crockett
(74) *Attorney, Agent, or Firm* — Banner & Witcoff, Ltd.

(57) ABSTRACT

An optical microscope (1) is provided herewith that is configured to provide an image in an image plane (3) of an object in an object plane (5). The optical microscope comprises in an order along an optical axis (6) from the object plane to the image plane, a first lens (7), a second lens (11) and a third lens (14). The first lens (7) has a first lens surface (8) at the side of the object plane and a second lens surface (9) at a side of the image plane, the first lens surface having a first semi-reflective coating (10). The second lens (11) has a third lens surface (12) at the side of the object plane and a fourth lens surface (13) at a side of the image plane. The third lens (14) has a fifth lens surface (15) at the side of the object plane and a sixth lens surface (16) at a side of the (Continued)

image plane, the sixth lens surface having a second semi-reflective coating (17).

The optical microscope is compact and provides for a diffraction-limited performance (MTF) over the full field of view with low distortion and low field curvature.

20 Claims, 9 Drawing Sheets

(51) Int. Cl.
    *G02B 9/14*     (2006.01)
    *G02B 21/02*     (2006.01)
    *G02B 21/08*     (2006.01)
    *G02B 21/36*     (2006.01)
    *H01L 21/67*     (2006.01)
    *H01L 21/68*     (2006.01)

(52) U.S. Cl.
    CPC ......... *G02B 21/082* (2013.01); *G02B 21/362* (2013.01); *G02B 21/365* (2013.01); *H01L 21/67259* (2013.01); *H01L 21/682* (2013.01)

(56) References Cited

U.S. PATENT DOCUMENTS

| | | | |
|---|---|---|---|
| 2015/0131147 A1* | 5/2015 | Ouzounov | G02B 17/0896 359/368 |
| 2017/0296060 A1* | 10/2017 | Ghosh | G02B 27/141 |
| 2020/0081257 A1* | 3/2020 | Chan | G02B 27/0955 |
| 2020/0183142 A1* | 6/2020 | Zheng | G02B 21/082 |

* cited by examiner

COMPACT OPTICAL MICROSCOPE, METROLOGY DEVICE COMPRISING THE OPTICAL MICROSCOPE AND A WAFER POSITIONING METROLOGY APPARATUS COMPRISING THE METROLOGY DEVICE

CROSS-REFERENCE TO RELATED APPLICATIONS

This application is a U.S. National Stage application under 35 U.S.C. § 371 of International Application PCT/NL2022/050200 (published as WO 2022/220678 A1), filed Apr. 12, 2022, which claims the benefit of priority to Application NL 2027950, filed Apr. 12, 2021. Each of these prior applications is hereby incorporated by reference in its entirety.

BACKGROUND

Optical microscopes are used in wide variety of applications. An example thereof is its use for position metrology in semiconductor manufacturing. Typically, a wafer being manufactured therein is provided with marks having respective predetermined positions on the wafer. A metrology device equipped with an optical microscope is provide a position signal to control a positioning device for aligning the wafer with respect to a reference lithography mask. The metrology device comprises a digital camera and a digital image processing device to render the position signal.

Chinese patent application CN210005782 discloses an objective lens array for multi-view parallel imaging an object in an object plane as an image in an image plane. Each element in the array comprises a microscope objective unit having a first lens located in a first lens array at the side of the object plane and a second lens in a second lens array at the side of the image plane. The surface of the first lens facing the object surface as well as a surface of the second lens facing the image plane are provided with a semi-transmissive coating. The optic microscope therewith renders possible a short total track of the system, i.e. the distance between the image plane and the object plane.

In the known optic microscope each microscope objective unit is configured to provide for an image near its optical axis. The individual microscope objective units however are not suitable for providing an image of acceptable quality over a wide field of view. A wide field of view is defined as field of view of at least 1 mm×1 mm in the object plane. Accordingly, there is a need for an optic microscope that renders possible providing a qualitatively acceptable wide field image of an object, with a relatively short total track of the system.

As further background information it is noted that US 2020/183142 discloses a wide-field multi-scale high-resolution microscopic imaging system, which includes a light source, a sample, a microscope imaging objective system, an acquisition system, and a work-station. The microscope imaging objective system is used for forming an image after a light beam emitted by the light source illuminates the sample. To obtain a wide-field curved image planer, the acquisition system includes an acquisition lens array for subfield acquisition of the curved image plane, and a camera array for secondary imaging. The work-station is used for analyzing the acquired image in overlapping fields of view, and performing image splicing based on the fields of view, to finally obtain a wide-field high-resolution image.

Also it is noted that US 2014/226203 discloses a catadioptric system that includes a first catadioptric group, a second catadioptric group, and a lens group disposed in axial alignment with each other. The first catadioptric group includes a solid lens having an input surface, a primary reflective surface, secondary reflective surface and an exit surface. The primary reflective surface is a curved surface concave towards the secondary reflective surface. A light flux entering through the input surface undergoes more than two reflections between the primary and secondary reflective surfaces, prior to exiting through the exit surface. At least one of the primary reflective surface and secondary reflective surface has a continuous and smooth topological profile

SUMMARY

In order to address the above-mentioned need, according to a first aspect of the disclosure, an optical microscope is provided that comprises in an order along an optical axis from an object plane to an image plane the following components:
- a first lens having a first lens surface at the side of the object plane and a second lens surface at a side of the image plane, the first lens surface having a first semi-reflective coating;
- a second lens having a third lens surface at the side of the object plane and a fourth lens surface at a side of the image plane; and
- a third lens having a fifth lens surface at the side of the object plane and a sixth lens surface at a side of the image plane, the sixth lens surface having a second semi-reflective coating.

In the optical microscope comprising a first, a second and a third lens, it is achieved that light rays originating from the object plane have a substantially orthogonal angle of incidence onto the second semi-reflective coating. More in particular, an angle of incidence of a light ray originating from the object-plane and incident onto the second semi-reflective coating for the first time does not deviate more than 2.6 degrees from a surface normal of the second semi-reflective coating.

As will be apparent from the disclosure, the compact optical microscope therewith achieves a diffraction-limited performance (MTF) over the full field of view is obtained with low distortion and low field curvature.

According to a second aspect of the disclosure, a metrology device comprising an embodiment of an optical microscope according to the first aspect, and further comprising a digital camera arranged in the image plane of the optical microscope to issue a digital image signal representative for an image in the image plane of the optical microscope and a digital image processing device to process the digital image signal and to issue an image feature position signal indicative for a position of an image feature in the image.

In exemplary embodiments, the optical microscope has a magnification (M) in a range of 3 to 7. This range is particularly for use of the optical microscope in combination with a digital image sensor.

According to a third aspect of the disclosure, a wafer positioning metrology apparatus is provided that comprises a positioning device for positioning a wafer and a metrology device according to the second aspect. The image feature of which the position is to be determined is an image of a marker on the wafer, and the positioning device is configured to use the image feature position signal to position the wafer.

BRIEF DESCRIPTION OF THE DRAWINGS

These and other aspects are described in more detail with reference to the drawings. Therein.

DETAILED DESCRIPTION OF EMBODIMENTS

Figure 1A:
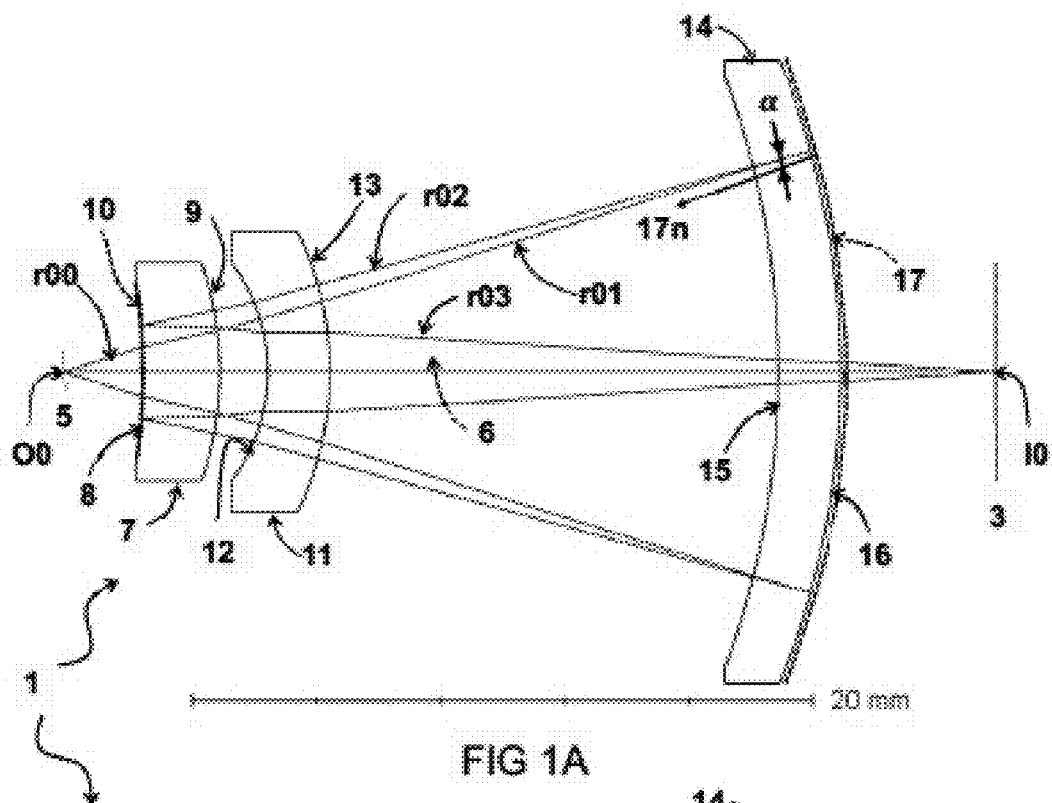
FIG. 1A, 1B schematically show an embodiment of an optical microscope according to the first aspect.
Figure 1B:
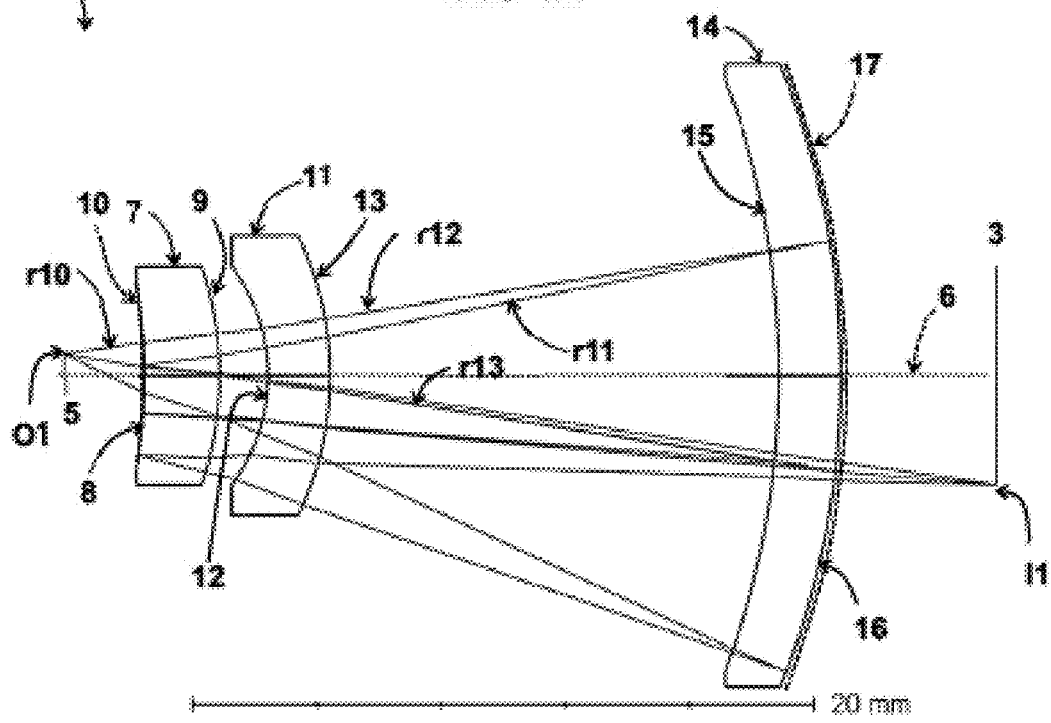

FIG. 1A, 1B schematically show an embodiment of an optical microscope 1 according to the present disclosure having a magnification M=5. The optical microscope 1 comprises in an order along an optical axis 6 from an object plane 5 to an image plane 3 a first lens 7, a second lens 11 and a third lens 14. The first lens 7 has a first lens surface 8 facing the object plane 5 and a second lens surface 9 facing the image plane 3. The second lens 11 has a third lens surface 12 facing the object plane 5 and a fourth lens surface 13 facing the image plane 3. The third lens 14 has a fifth lens surface 15 facing the object plane 5 and a sixth lens surface 16 facing the image plane 3. The first lens surface 8 of the first lens 7 is provided with a semi-reflective coating. Also the sixth lens surface 16 of the third lens 14 is provided by a reflective coating.

In use, the optical microscope to provide an image in the image plane 3 of an object in the object plane 5.

FIG. 1A shows exemplary optical paths originating from a position O0 in the object plane intersected by the optical axis. This position is denoted as the origin of the object plane. The image of the origin O0 is mapped at the origin 10 in the image plane 3. FIG. 1B shows exemplary optical paths originating from a position O1 at 0.7 mm above the origin O0. The image of position O1 is mapped at position I1 in the image plane 3.

As further shown in FIG. 1A, 1B a ray r00, r10 respectively originating from positions O0, O1 of the object plane is transmitted through the first semi-reflective coating 10 of the first lens 7 and transmitted through the first lens 7 and the second lens 11 as a ray r01, r11 towards the third lens 14 where it is reflected at the second semi-reflective coating 17 on the sixth lens surface 16 of the third lens 14 as ray r02, r12.

As shown further in FIG. 1A, 1B ray r02, r12 is subsequently transmitted through the third lens 14, the second lens 11 and the first lens 7 and reflected at the first semi-reflective coating 10 on the first lens surface 8 of the first lens 7. The reflected ray is transmitted again through the first lens 7 and the second lens 11 as ray r03, r13 that is subsequently transmitted via the third lens 14 to the image plane. It is noted that the first semi-reflective coating 10 will also partially reflect the ray r00, r10 and partially transmit the ray r02, r12. Likewise, the second semi-reflective coating 17 will partially transmit ray r01, r11 and partially reflect ray r03, r13. For clarity this is not shown in FIG. 1A.

The first lens 7, the second lens 11 and the third lens 14 are configured such that the angle α of incidence of the ray r01 relative to the surface normal 17n of the second semi-reflective coating 17 is not more than 2.6 degrees such that the reflected ray r02, r12 has a direction that is radially slightly outward relative to the ray r01, r11. Therewith a diffraction-limited performance (MTF) over the full field of view is obtained with low distortion and low field curvature.

Figure 2:
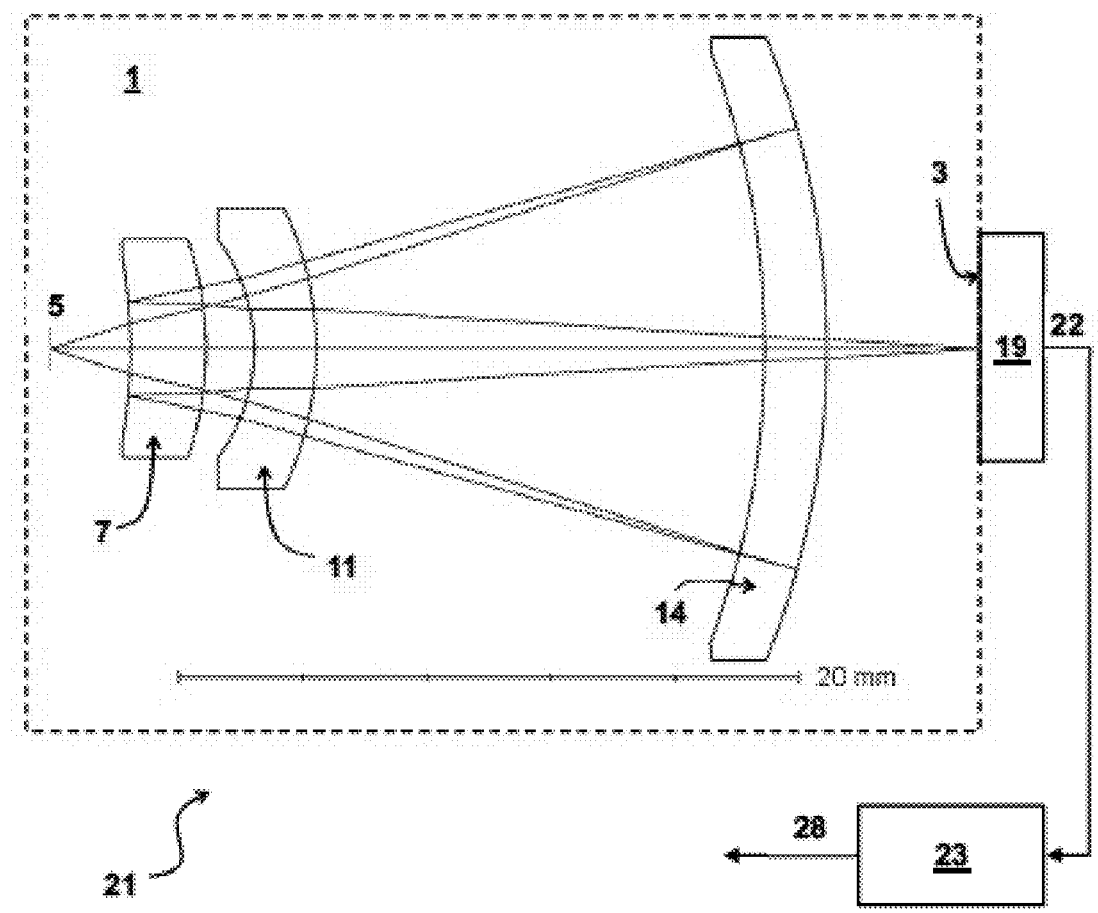
FIG. 2 schematically shows an embodiment of a metrology device according to the second aspect that comprising an embodiment of the optical microscope according to the first aspect.

FIG. 2 schematically shows a metrology device 21 that comprises an embodiment of an optical microscope 1 as disclosed herein. A digital camera 19 is arranged in the image plane 3 of the optical microscope 1 that issues a digital image signal 22 representative for an image in the image plane 3 of the optical microscope. The metrology device 21 also comprises a digital image processing device 23 that processes the digital image signal 2 and issues an image feature position signal 28 indicative for a position of an image feature in the image.

Figure 3:
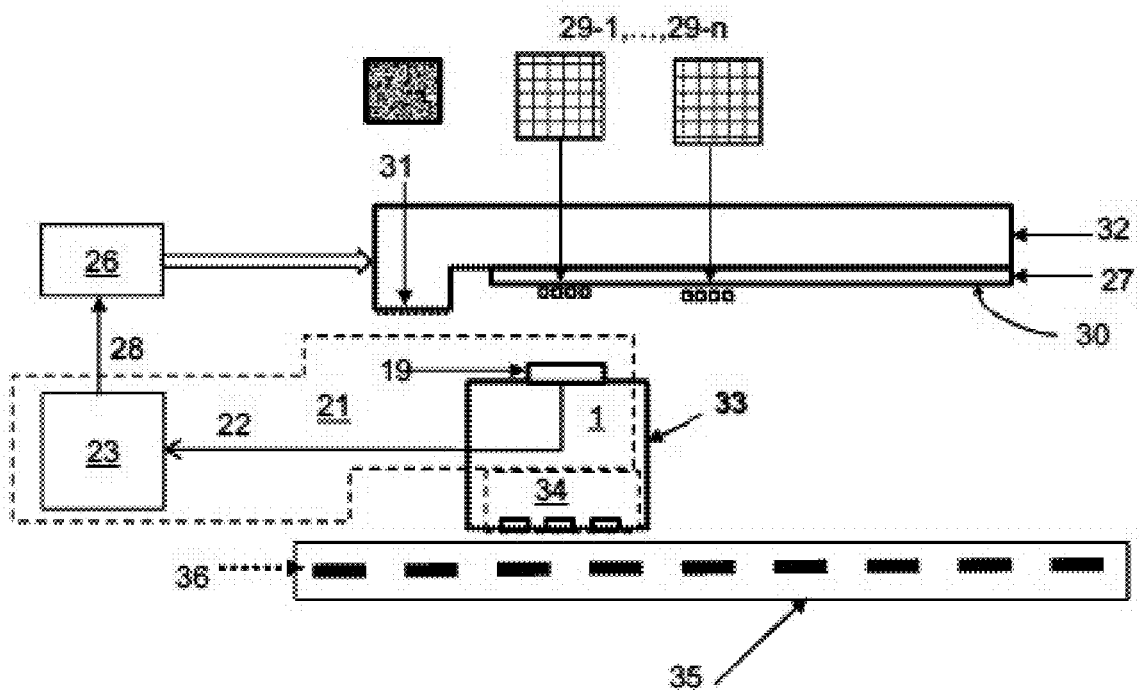
FIG. 3 schematically shows an embodiment of a wafer positioning metrology apparatus according to the third aspect that comprises an embodiment of the metrology device according to the second aspect.

FIG. 3 shows a wafer positioning metrology apparatus 20 that comprises a positioning device 26 for positioning a wafer 27 and a metrology device 21, such as the metrology device 21 depicted in FIG. 2. The image feature 25 is an image of a marker 29-1, . . . , 29-n on a surface 30 of the wafer, and the positioning device 26 is configured to use the image feature position signal 28 to position the wafer 27 relative to a fiducial 31 on a wafer carrier 32. In the example shown, the optical microscope 1 is accommodated in a head 33 that has the digital camera 19 at one side facing the wafer 27 and that further accommodates an encoder 34 that faces a grid plate 35 provided with a grid 36. In operation, the wafer positioning metrology apparatus is configured to find all markers on the wafer to make a "wafer map". Therewith the grid plate 35 encoder combination can be calibrated.

Exemplary embodiments of the optical microscope 1 are presented below in more detail. In these examples, the first, the second and the third lens are of a material that has a refractive index in a range between 1.50 and 1.52 and that has an Abbe number for a d-line in a range between 60 to 70. The test results were prepared using a wavelength in the range of 0.47 to 0.49 μm

Example 1

In a first example the system focal distance fs is 9.1 mm and the system magnification M is equal to 3. The first, second and the third lens respectively have a focal length f1=39.17 mm, f2=−46.81 mm and f3=27.74 mm. In this example the first lens 7 has a thickness of 3 mm and is provided with a first lens surface 8 and a second lens surface 9 having a radius of curvature of −26.17 mm and −11.94 mm respectively. It is noted that in this and other examples the negative sign is used to indicate that a lens surface is concave as observed from the side of the object plane 5. The second lens 11 has a thickness of 2 mm and is provided with a third lens surface 12 and a fourth lens surface 13 having a radius of curvature of −7.33 mm and −11.44 mm respectively. The third lens 14 also has a thickness of 2 mm and is provided with a fifth lens surface 15 and a sixth lens surface 16 having a radius of curvature of −24.90 mm and −26.49 mm respectively. The lenses are positioned as follows along the optical axis 6. The distance between the object plane 5 and the first lens surface 8 is 5.39 mm. The distance between the second lens surface 9 and the third lens surface 12 is 0.78 mm. The distance between the fourth lens surface 13 and the fifth lens surface 15 is 11.83 mm and the distance between the sixth lens surface 16 and the image plane 3 is 5 mm. It is noted that in these and other examples, the distances are defined with respect to the intersection points of the optical axis with the lens surfaces and with the object plane 5 and the image plane 3.

The first lens surface 8 and the sixth lens surface 16 are provided with a first semi-reflective coating 10 and a second semi-reflective coating 17 respectively. In these examples the semi-reflective coatings are dielectric coatings which, for a wavelength range of 450 nm<λ<500 nm and a normal angle of incidence, are configured to reflect about 50% of the incident light and to transmit the remaining 50%. In practice losses are negligible.

It is noted that some cases, locally a fully reflective coating may be applied. For example at the periphery of the sixth lens surface 16 outside the range of the image plane 3, a fully reflective coating may be applied.

Figure 4A:
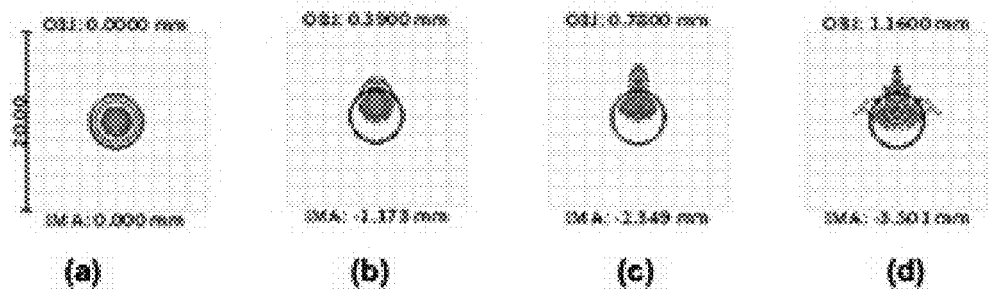
FIG. 4A-4D illustrates a performance of a first embodiment of an optical microscope according to the first aspect.

FIG. 4A shows the spot diagram for various object positions at various radial distances from the origin defined by the intersection with the optical axis. The radial distances selected are 0 mm (a), 0.39 mm (b), 0.78 mm (c) and 1.16 mm (d). As becomes apparent from FIG. 4A, the spot size is in any case well below 20 micron. The airy radius is 2.93 μm. Further observations are presented in Table I below.

TABLE I data for FIG. 4A

| Field | $r_{gms}$ (μm) | $r_{geo}$ (μm) |
|---|---|---|
| (a) | 1.154 | 2.322 |
| (b) | 1.841 | 4.289 |
| (c) | 2.495 | 5.763 |
| (d) | 2.655 | 5.970 |

Figure 4B:
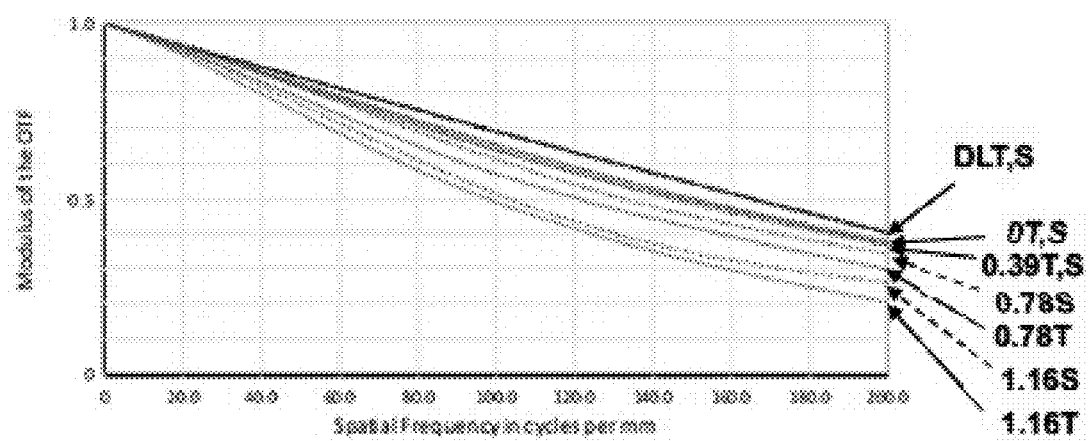

FIG. 4B shows the modulation transfer function MTF of the optical microscope (1) of Example 1. Therein the vertical axis indicates the modulus of the OTF and the horizontal axis indicates the spatial frequency in cycles per mm.

In this example, the DLT,S refer to the overlapping curves for the diffraction limited tangential and sagittal case. Reference sign 0 T,S refers to the overlapping curves for the tangential and the sagittal transfer function determined for the origin of the object plane. Reference sign 0.39 T,s indicates the overlapping curves for the tangential and the sagittal transfer function determined for positions at a distance of 0.39 mm from the origin of the object plane. Reference signs 0.78 S and 0.78 T respectively indicate the curves for the tangential and the sagittal transfer function determined for positions at a distance of 0.78 mm from the origin of the object plane. Reference signs 1.16 S and 1.16 T respectively indicate the curves for the tangential and the sagittal transfer function determined for positions at a distance of 1.16 mm from the origin of the object plane.

It can be seen that even for relatively high spatial frequencies in the order of 100 cycles per mm the modulus of the OTF is at least 0.5 over a field of view within a radius of 1.16 mm from the origin.

Figure 4C:
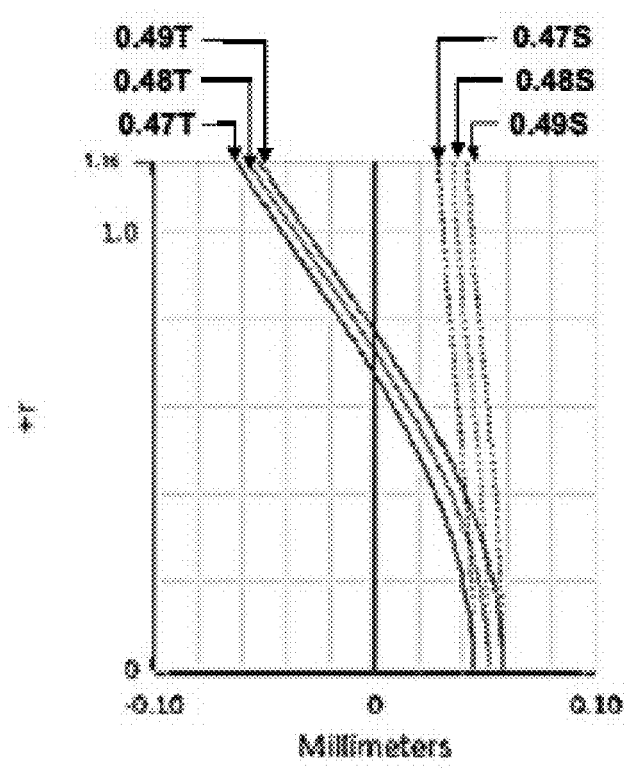

FIG. 4C shows the tangential (T) and sagittal (S) field curvature measured for various wavelengths. The legend indicates the wavelength in micron, e.g. the curve 0.47 T is the tangential field curvature measured for a wavelength of 0.47 micron. It can be seen in FIG. 5A, that the magnitude of the sagittal field curvature is about 0.0157 mm and that the magnitude of the tangential field curvature is about 0.109 mm.

Figure 4D:
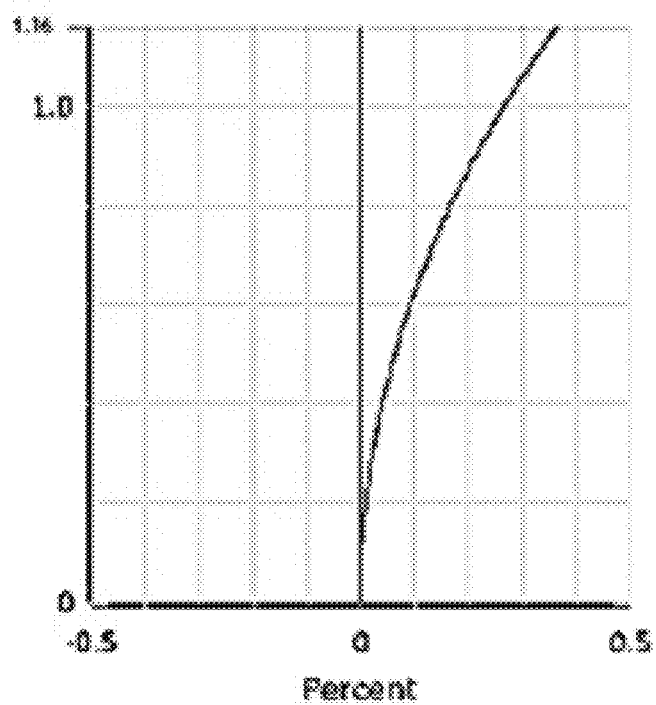

FIG. 4D shows the distortion measured for the optical microscope (1) of example 1. It becomes apparent from FIG. 4D that the distortion is less than 0.5% over the entire field of view with a radius of 1.16 mm.

Example 2

In a second example the system, which is shown in detail in FIG. 1A, 1B, the focal distance fs is 6.2 mm and the system magnification M is equal to 5. The first, second and the third lens respectively have a focal length f1=46.77 mm, f2=−30.73 mm and f3=21.83 mm.

In this example the first lens 7 has a thickness of 2.44 mm and is provided with a first lens surface 8 and a second lens surface 9 having a radius of curvature of −17.84 mm and −10.8 mm respectively. The second lens 11 has a thickness of 2 mm and is provided with a third lens surface 12 and a fourth lens surface 13 having a radius of curvature of −5.85 mm and −10.27 mm respectively. The third lens 14 also has a thickness of 2 mm and is provided with a fifth lens surface 15 and a sixth lens surface 16 having a radius of curvature of −27.09 mm and −26.59 mm respectively. The lenses are positioned as follows along the optical axis 6. The distance between the object plane 5 and the first lens surface 8 is 2.58 mm. The distance between the second lens surface 9 and the third lens surface 12 is 1.55 mm. The distance between the fourth lens surface 13 and the fifth lens surface 15 is 11.44 mm and the distance between the sixth lens surface 16 and the image plane 3 is 5 mm.

Figure 5A:
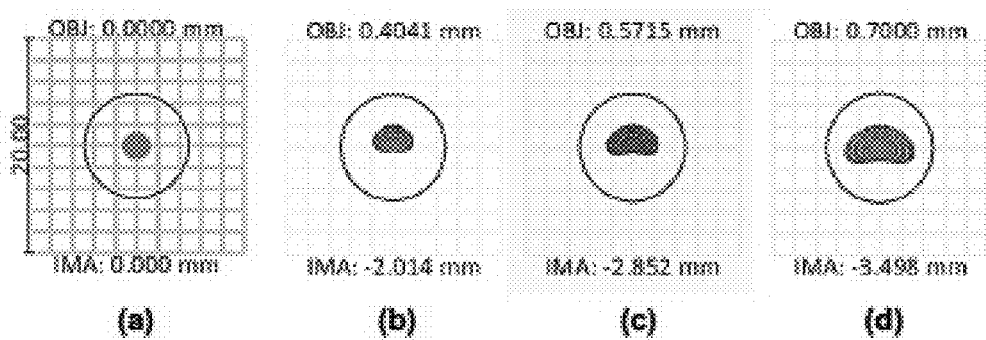
FIG. 5A-5D illustrates a performance of a first embodiment of an optical microscope according to the first aspect.

FIG. 5A shows the spot diagram for various object positions at various radial distances from the origin defined by the intersection with the optical axis. The radial distances selected are 0 mm (a), 0.4041 mm (b), 0.517 mm (c) and 0.7000 mm (d). As becomes apparent from FIG. 5A, the spotsize is in any case well below 20 micron.

The airy radius is 4.856 μm. Further observations are presented in Table II below.

TABLE II data for FIG. 5A

| Field | $r_{gms}$ (μm) | $r_{geo}$ (μm) |
|---|---|---|
| (a) | 0.723 | 1.157 |
| (b) | 0.926 | 1.975 |
| (c) | 1.158 | 2.363 |
| (d) | 1.548 | 3.171 |

Figure 5B:
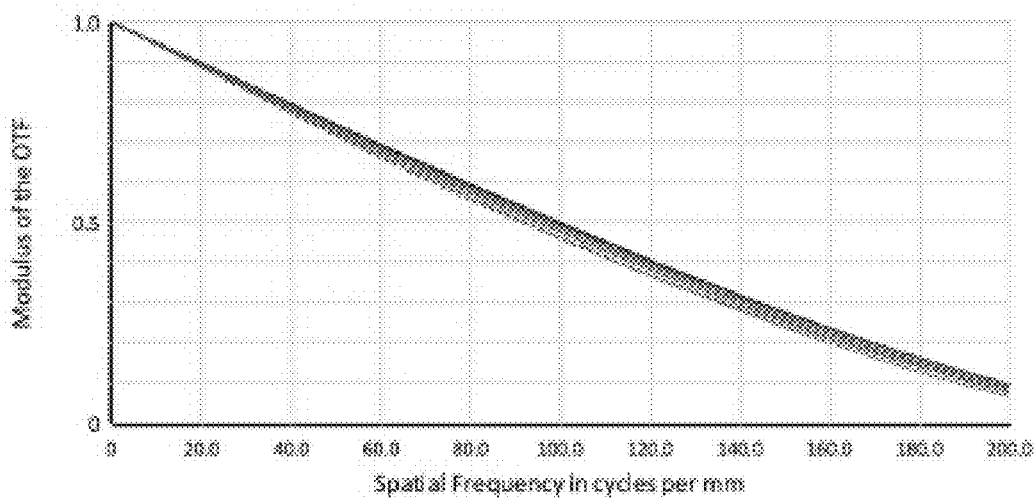

FIG. 5B shows the MTF for this arrangement of Example 2, including both the tangential and sagittal curves for a position in the origin of the object plane, and at positions at a distance of 0.4041 mm, 0.5715 mm and 0.7000 mm from the origin of the object plane. The curves substantially overlap, and show that MTF has a magnitude of at least 0.5 for spatial frequencies up to 100/mm.

Figure 5C:
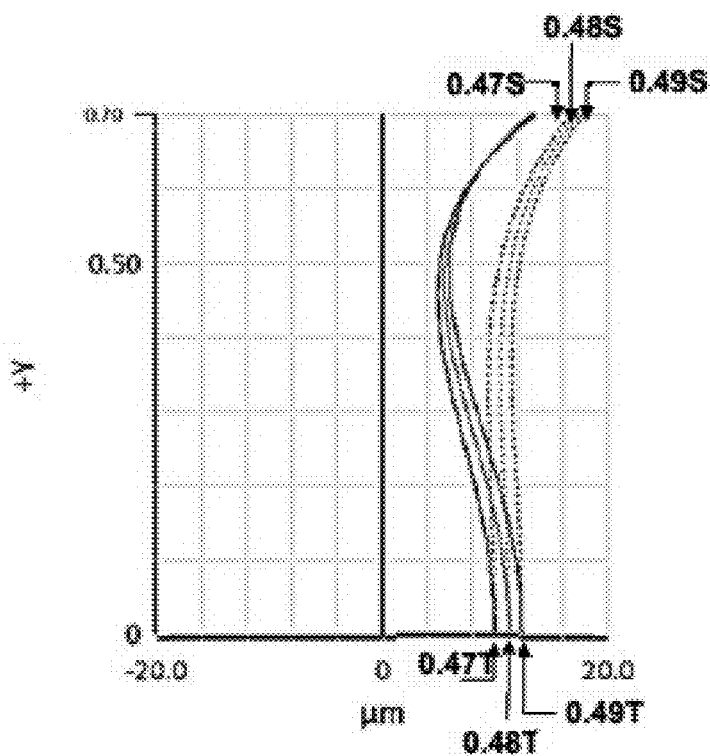

FIG. 5C shows the tangential (T) and sagittal (S) field curvature measured for various wavelengths. The legend indicates the wavelength in micron, e.g. the curve 0.47 T is the tangential field curvature measured for a wavelength of 0.47 micron. It can be seen in FIG. 5C that the magnitude of the sagittal field curvature is about 0.0068 mm and that the magnitude of the tangential field curvature is about 0.079 mm.

Figure 5D:
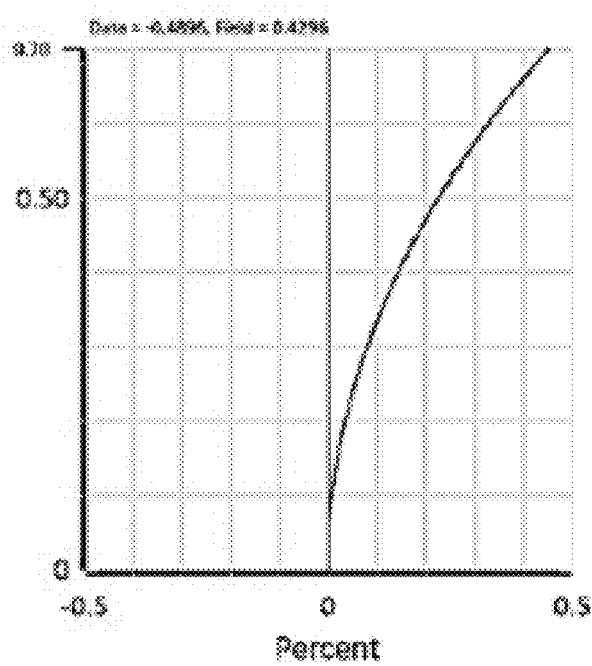

FIG. 5D shows the distortion measured for the optical microscope (1) of example I. It becomes apparent from FIG.

5D that the distortion is less than 0.5% over the entire field of view with a radius of 0.7 mm.

Example 3

In a third example the system focal distance fs is 4.3 mm and the system magnification M is equal to 7. The first, second and the third lens respectively have a focal length f1=46.29 mm, f2=−16.21 mm and f3=20.68 mm.

In this third example the first lens 7 has a thickness of 2 mm and it is provided with a first lens surface 8 and a second lens surface 9 having a radius of curvature of −12.74 mm and −8.8 mm respectively. The second lens 11 has a thickness of 2 mm and is provided with a third lens surface 12 and a fourth lens surface 13 having a radius of curvature of −4.27 mm and −9.97 mm respectively. The third lens 14 has a thickness of 2.3 mm and is provided with a fifth lens surface 15 and a sixth lens surface 16 having a radius of curvature of −27.38 mm and −25.76 mm respectively. The lenses are positioned as follows along the optical axis 6. The distance between the object plane 5 and the first lens surface 8 is 2.5 mm. The distance between the second lens surface 9 and the third lens surface 12 is 1.2 mm. The distance between the fourth lens surface 13 and the fifth lens surface 15 is 15 mm and the distance between the sixth lens surface 16 and the image plane 3 is 5 mm.

Figure 6A:
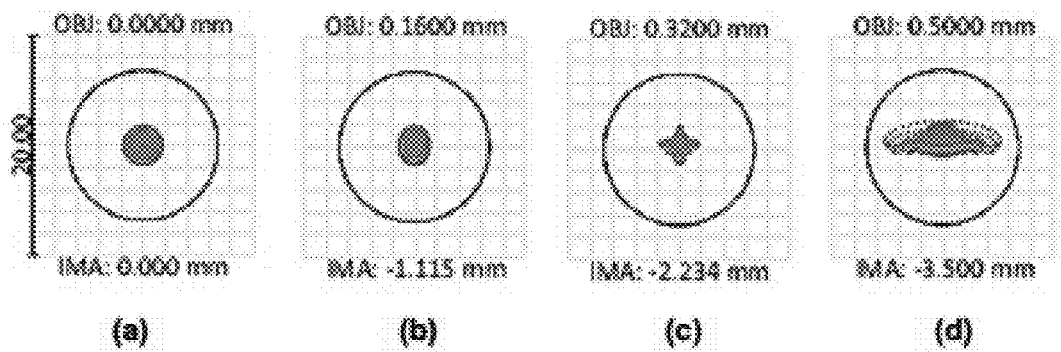
FIG. 6A-6D illustrates a performance of a first embodiment of an optical microscope according to the first aspect.

FIG. 6A shows the spot diagram for various object positions at various radial distances from the origin defined by the intersection with the optical axis. The radial distances selected are 0 mm (a), 0.16 mm (b), 0.32 mm (c) and 0.5 mm (d). As becomes apparent from FIG. 6A, the spotsize is in any case well below 20 micron.

The airy radius is 6.794 μm. Further observations are presented in Table III below.

TABLE III data for FIG. 6A

| Field | $r_{gms}$ (μm) | $r_{geo}$ (μm) |
|---|---|---|
| (a) | 1.249 | 1.728 |
| (b) | 1.087 | 1.854 |
| (c) | 0.970 | 2.034 |
| (d) | 2.212 | 5.303 |

Figure 6B:
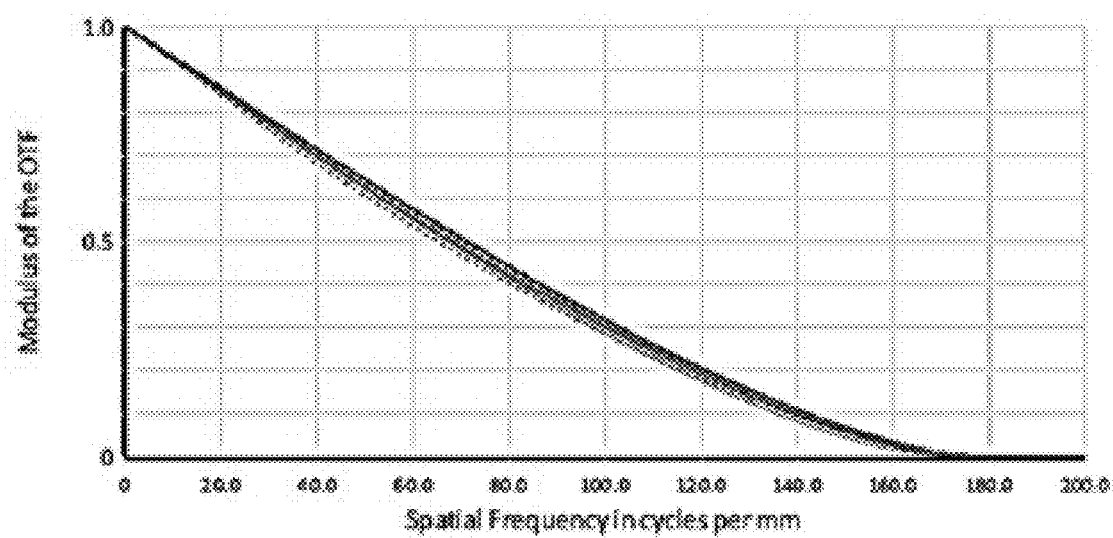

FIG. 6B shows the MTF for this arrangement showing both the tangential and sagittal curves for a positions in the origin of the object plane, and at positions at a distance of 0.16 mm, 0.32 mm and 0.5 mm from the origin of the object plane. The curves substantially overlap, and show that MTF has a magnitude of at least 0.5 for spatial frequencies up to 70/mm.

Figure 6C:
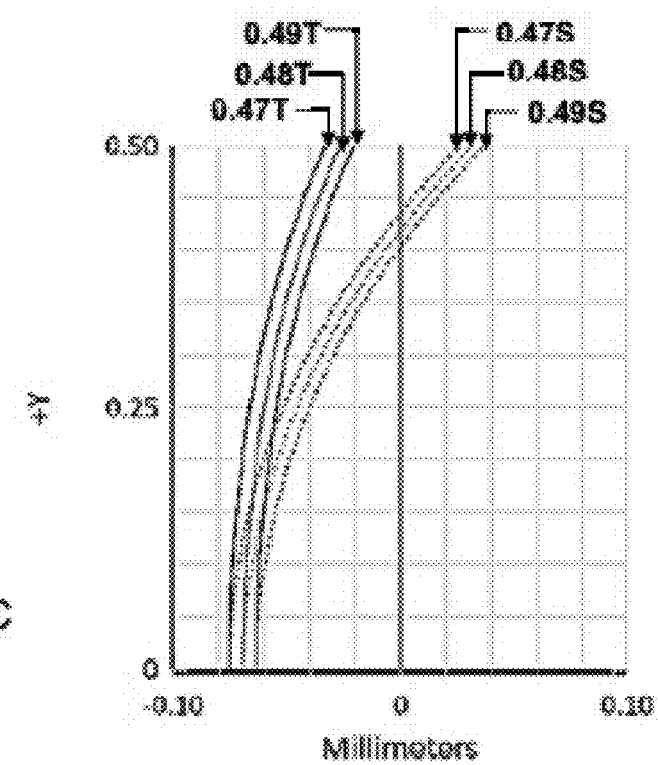

FIG. 6C shows the tangential (T) and sagittal (S) field curvature measured for various wavelengths. The legend indicates the wavelength in micron, e.g. the curve 0.47 T is the tangential field curvature measured for a wavelength of 0.47 micron. It can be seen in FIG. 6C, that the magnitude of the sagittal field curvature is about 0.1011 mm and that the magnitude of the tangential field curvature is about 0.0426 mm.

Figure 6D:
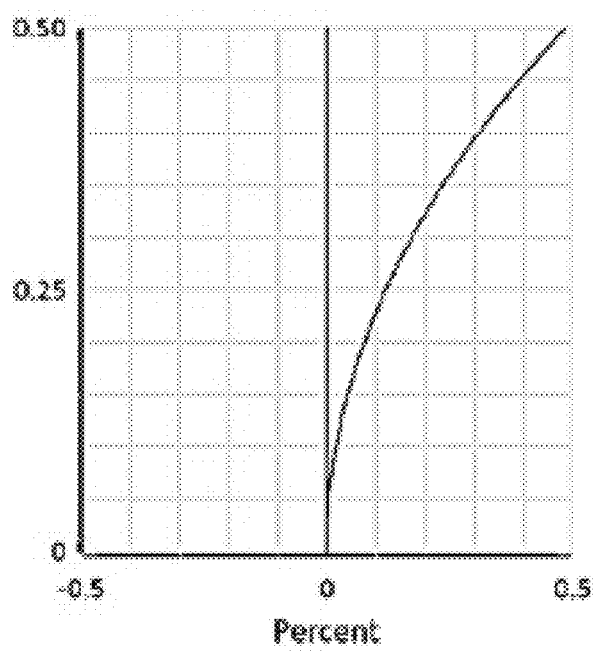

FIG. 6D shows the distortion measured for the optical microscope (1) of example 3. It becomes apparent from FIG. 6D that the distortion is less than 0.5% over the entire field of view with a radius of 0.5 mm.

In each of the examples presented above the optical microscope 1 is very compact. The distance between the object plane and the image plane is as small as 30 mm. As is further shown the improved optical microscope 1 achieves a diffraction-limited performance over the full field of view (more than 1×1 mm) with a low distortion and flattened image plane. The field curvature is less than 100 um, and in some cases even less than 20 um.

The inventor recognized that numerous other examples can be provided with the following design rules.

Depending on a required magnification M and diagonal size sd of the image plane 3 a system focal distance can be determined with the following relationship.

$$fs = \frac{(9.8 - M)^2}{8} + 0.474 \cdot sd$$

Having determined a value for the system focal distance fs, the focal distance f1, f2, f3 of the first, second and third lens can be determined by taking into account the following ranges for the ratio thereof relative to the system focal distance.

$$4.3 \le \frac{f1}{fs} \le 10.8$$

$$-5.2 \le \frac{f2}{fs} \le -3.7$$

$$3 \le \frac{f3}{fs} \le 4.9$$

The thicknesses t1, t2, t3 of the first lens 7, the second lens 11 and the third lens 14 are related to the size sd as follows.

$$0.28 \le \frac{t1}{sd} \le 0.43$$

$$0.28 \le \frac{t2}{sd} \le 0.33$$

$$0.28 \le \frac{t3}{sd} \le 0.33$$

The lenses preferably are made of a material having a refractive index in the range of 1.45 to 1.55, more preferably in the range of 1.50 to 1.52. The Abbe number for a d-line should be in the range of 60 to 70. Various materials, such as glasses and polymers are suitable for this purpose.

The distances do1 between the object plane and the first lens surface 8, d12 between the second lens surface 9 and third lens surface 12, d23 between the fourth lens surface 13 and the fifth lens surface 15, as well as the distance d3i between the sixth lens surface 16 and the image plane 3 are related to the size sd as follows.

$$0.35 \le \frac{do1}{sd} \le 0.76$$

$$0.10 \le \frac{d12}{sd} \le 0.22$$

$$1.68 \le \frac{d23}{sd} \le 2.14$$

$$0.70 \le \frac{d3i}{sd} \le 0.72$$

The invention claimed is:

1. An optical microscope configured to provide an image in an image plane of an object in an object plane, the optical microscope comprising in an order along an optical axis from the object plane to the image plane:
   a first lens having a first lens surface at the side of the object plane and a second lens surface at a side of the image plane;
   a second lens having a third lens surface at the side of the object plane and a fourth lens surface at a side of the image plane; and
   a third lens having a fifth lens surface, at the side of the object plane and a sixth lens surface at a side of the image plane,
   wherein the first lens surface surface has a first semi-reflective coating and the sixth lens surface has a second semi-reflective coating.

2. The optical microscope according to claim 1, wherein the first lens and the third lens have a positive focal length and the second lens has a negative focal length.

3. The optical microscope according to claim 1, wherein a distance between the first lens and the second lens is less than one third of a distance between the second lens and the third lens.

4. The optical microscope according to claim 1 having a magnification (M) in a range of 3 to 7.

5. The optical microscope according to claim 4, having a system focal distance ($f_s$) which is determined by the magnification (M) and an image diagonal (sd) with the following relationship:

$$fs = \frac{(9.8 - M)^2}{8} + 0.474 \cdot sd.$$

6. The optical microscope according to claim 5, wherein the first lens, the second lens and the third lens respectively have a focal distance f1, f2 and f3 that is related to the system focal distance fs by the following relationships:

$$4.3 \leq \frac{f1}{fs} \leq 10.8$$

$$-5.2 \leq \frac{f2}{fs} \leq -3.7$$

$$3 \leq \frac{f3}{fs} \leq 4.9.$$

7. The optical microscope according to claim 1, wherein an angle of incidence of a light ray originating from the object-plane, and incident onto the second semi-reflective coating for the first time does not deviate more than 2.6 degrees from a surface normal of the second semi-reflective coating.

8. The optical microscope according to claim 1, wherein the first lens, the second lens and the third lens are of a material having a refractive index in a range between 1.45 and 1.55.

9. The optical microscope according to claim 8, wherein the first lens, the second lens and the third lens are of a material having a refractive index in a range between 1.50 and 1.52.

10. The optical microscope according to claim 8, wherein the material of the lenses has an Abbe number for a d-line in a range between 60 to 70.

11. The optical microscope according to claim 1, wherein the thickness (t1) of the first lens, the thickness (t2) of the second lens and the thickness (t3) of the third lens are related to a diagonal size (sd) of the image plane as follows:

$$0.28 \leq \frac{t1}{sd} \leq 0.43$$

$$0.28 \leq \frac{t2}{sd} \leq 0.33$$

$$0.28 \leq \frac{t3}{sd} \leq 0.33.$$

12. The optical microscope according to claim 1, wherein the distance (do1) between the object plane and the first lens surface, the distance (d12) between the second lens surface and the third lens surface, the thickness (d23) between the fourth lens surface and the fifth lens surface, as well as the distance (d3i) between the sixth lens surface, and the image plane are related to a diagonal size (sd) of the image plane as follows:

$$0.35 \leq \frac{do1}{sd} \leq 0.76$$

$$0.10 \leq \frac{d12}{sd} \leq 0.22$$

$$1.68 \leq \frac{d23}{sd} \leq 2.14$$

$$0.70 \leq \frac{d3i}{sd} \leq 0.72.$$

13. A metrology device comprising
   an optical microscope configured to provide an image in an image plane of an object in an object plane, the optical microscope comprising in an order along an optical axis from the object plane to mage plane,
   a first lens having a first lens surface at the side of the object plane and a second lens surface at a side of image plane;
   second lens having a third lens surface at the side of the object plane and a fourth lens surface at a side of the image plane; and
   a third lens having a fifth lens surface at the side of the object plane and a sixth lens surface at a side of the image plane,
   wherein the first lens surface has a first semi-reflective coating a sixth lens surface as a second semi-reflective coating;
   a digital camera arranged in the image plane of the optical microscope to issue a digital image signal representative for an image in the image plane of the optical microscope, and
   a digital image processing device to process the digital image signal and to issue an image feature position signal indicative for a position of an image feature in the image.

14. The metrology device according to claim 13, wherein the first lens and the third lens of the optical microscope have a positive focal length and the second lens of the optical microscope has a negative focal length.

15. The metrology device according to claim 13, wherein a distance between the first lens and the second lens of the optical microscope is less than one third of a distance between the second lens and the third lens of the optical microscope.

16. The metrology device according to claim 13, wherein the optical microscope has a magnification in a range of 3 to 7.

17. A wafer positioning metrology apparatus comprising:
a positioning device for positioning a wafer;
an optical microscope configured to provide an image in an image plane of the wafer in an object plane, wherein the optical microscope comprises in an order along an optical axis from the object plane to the image plane,
a first lens having a first lens surface at the side of the object plane and a second lens surface at a side of the image plane;
a second lens having a third lens surface at the side of the object plane and a fourth lens ace at a side of the image plane; and
a third lens having a fifth lens surface at the side of the object plane and a sixth lens surface at a side of the image plane,
wherein the first lens surface has a semi-reflective coating and the sixth lens surface has a second se reflective coating,
a digital camera arranged in the image plane of the of the optical microscope to issue a digital image signal representative for an image in the image plane of the optical microscope; and
a digital image processing device to process the digital image signal and to issue an image feature position signal indicative for a position of an image feature in the image,
wherein the image feature is an image of a marker on the wafer, and the positioning device is configured to use the image feature position signal to position the wafer.

18. The wafer positioning metrology apparatus according to claim 17, wherein the first lens and the third lens of the optical microscope have a positive focal length and the second lens of the optical microscope has a negative focal length.

19. The wafer positioning metrology apparatus according to claim 17, wherein a distance between the first lens and the second lens of the optical microscope is less than one third of a distance between the second lens and the third lens of the optical microscope.

20. The wafer positioning metrology apparatus according to claim 17, wherein the optical microscope has a magnification in a range of 3 to 7.

* * * * *